US006754273B1

United States Patent
Sackstein et al.

(10) Patent No.: US 6,754,273 B1
(45) Date of Patent: Jun. 22, 2004

(54) METHOD FOR COMPRESSING AN AUDIO-VISUAL SIGNAL

(75) Inventors: David Sackstein, Netanya (IL); Yehuda Elmaliach, Rosh Ha'ayin (IL)

(73) Assignee: Optibase Ltd., Herzlia (IL)

( * ) Notice: Subject to any disclaimer, the term of this patent is extended or adjusted under 35 U.S.C. 154(b) by 0 days.

(21) Appl. No.: 09/402,441

(22) PCT Filed: Apr. 6, 1998

(86) PCT No.: PCT/IL98/00166

§ 371 (c)(1),
(2), (4) Date: Oct. 6, 1999

(87) PCT Pub. No.: WO98/45959

PCT Pub. Date: Oct. 15, 1998

(30) Foreign Application Priority Data

Apr. 6, 1997 (IL) .................................................. 120612

(51) Int. Cl.[7] .............................................. H04N 7/12
(52) U.S. Cl. ............................. 375/240.21; 375/240.26
(58) Field of Search .......................... 375/240, 240.21, 375/240.26, 240.28; 348/423.1

(56) References Cited

U.S. PATENT DOCUMENTS

| 4,589,130 A | | 5/1986 | Galand |
| 5,136,379 A | | 8/1992 | Ishii |
| 5,481,543 A | | 1/1996 | Veltman |
| 5,521,927 A | | 5/1996 | Kim et al. |
| 5,633,871 A | | 5/1997 | Bloks |
| 5,668,601 A | * | 9/1997 | Okada et al. ............... 348/423 |
| 5,966,385 A | * | 10/1999 | Fujii et al. .................. 370/465 |
| 6,278,733 B1 | * | 8/2001 | Bennett et al. ............. 375/240 |

FOREIGN PATENT DOCUMENTS

| WO | WO 96/13121 | * | 5/1996 | ............ H04N/5/76 |

* cited by examiner

Primary Examiner—Chris Kelley
Assistant Examiner—George A Bugg, Jr.
(74) Attorney, Agent, or Firm—Eitan, Pearl, Latzer & Cohen Zedek, LLP (57) ABSTRACT

A method and system are presented for producing an audio/video stream with improved video quality for a given bitrate, using non-standard sampling rates while preserving timely playback by the decoder. The method may include sub-sampling according to a duty cycle and/or time-slapping frames in an audio/visual stream.

14 Claims, 7 Drawing Sheets

METHOD FOR COMPRESSING AN AUDIO-VISUAL SIGNAL

FIELD OF THE INVENTION

The present invention relates to methods for compressing video and audio at low bit rates in general and to methods for compressing a sub-sampled MPEG video and audio in particular.

BACKGROUND OF THE INVENTION

A single channel audio signal is considered, in the art, a single dimension function of time, while a video signal is considered a two dimensional function of time. In the art, video and audio are each sampled separately, but generally, simultaneously, since they, usually, are related. Accordingly, video and audio have to be played back and displayed in a synchronous way.

Methods for compressing digital video and audio signals, as well as decompressing the compressed digital code, are known in the art. According to a family of standards, known as Motion Picture Expert Group (MPEG) such as ISO/IEC 11172 (MPEG-1) and ISO/IEC 13818 (MPEG-2), each frame or field of the original video signal, can be compressed into three main types of pictures. It is noted that a picture in MPEG can be either a video frame or a video field.

A first type is an intra-decoded picture (I-frame) which contains all of the information needed to produce a single original picture.

A second type is a predictive picture (P-frame) which includes information for producing an original video frame, based on a previous reference frame. A reference frame is an adjacent I-frame of P-frame. The size of a P-frame is typically smaller than the size of an I-frame. A third type is a bi-directional predictive (B-frame) which includes information for producing an original video frame, based on either the previous reference frame, the next reference frame or both. The size of a B-frame is typically smaller than the size of a P-frame.

Sub-sampling refers to sampling a given signal, audio or video, at a considerably low rate, lower than an optimal one, which is usually predetermined in a given standard.

For example, the human eye is not likely to detect a single frame in a visual signal which is updated 24 times or more, in a second. The human eye regards such a visual signal as continuous motion. Thus, a video sampling rate of at least 24 video samples (frames) per second provides fluent video motion.

Similarly, the human ear cannot detect high audio frequencies. Thus a sampling rate of at least 30 KHz is likely to provide an audio signal which can not be distinguished from the original, by the human ear.

Compression standards such as MPEG are usually restricted to working according to a predetermined closed list of sampling rates in video as well as audio.

For example, MPEG operates according to a video sampling rate of, generally, 25 samples (frames) per second (when operating according to a broadcasting standard such as PAL) or, alternatively, according to a video sampling rate of, generally, 29.97 samples (frames) per second (when operating according to a broadcasting standard such as NTSC). In the context of this application 30 frames per second refers to 29.97 frames per second and is used for convenience only.

MPEG audio compression can be applied to signals, which are sampled at 32 KHz, 44.1 KHz and 48 KHz MPEG-2 allows, in addition, sampling rates of 16 KHz and 22.05 KHz.

Given a set of sampling and compression parameters, lowering the bit-rate produced by the encoder degrades the quality. Methods for maximizing the ratio between quality and bit-rate for low bit-rate MPEG applications are known in the art.

One method known in the art is applicable to video compression. The method reduces the bit-rate without effecting the quality of compressed frames and is particularly suited to compressing video with little or no motion. According to the method the signal is sub-sampled before compression and therefore some of the frames are not compressed.

According to the method, a video signal is sub-sampled according to a predetermined or dynamic duty cycle.

Where this signal to be presented to an encoder, the duration of the stream at a standard video decoder would be a fraction of the original duration. To overcome this, according to this methodthe MPEG encoder is instructed to use IP encoding (no B frames) and the stream that is produced is edited after compression. A P frame is inserted in the stream in place of each discarded frame. These P frames specify that all of the information for the frame exists in the previous reference frame in the stream and are therefore relatively small. It will be noted that this method requires editing of the compressed stream. Those skilled in the art will appreciate that the edited stream will contain a complete frame set. Moreover, the stream will be smaller than a stream that is produced by a conventional encoder that is presented with a signal from which frames were discarded and replaced by duplication of the previous frame before encoding.

It will be noted that this method is not specified for audio compression.

Figure 1:
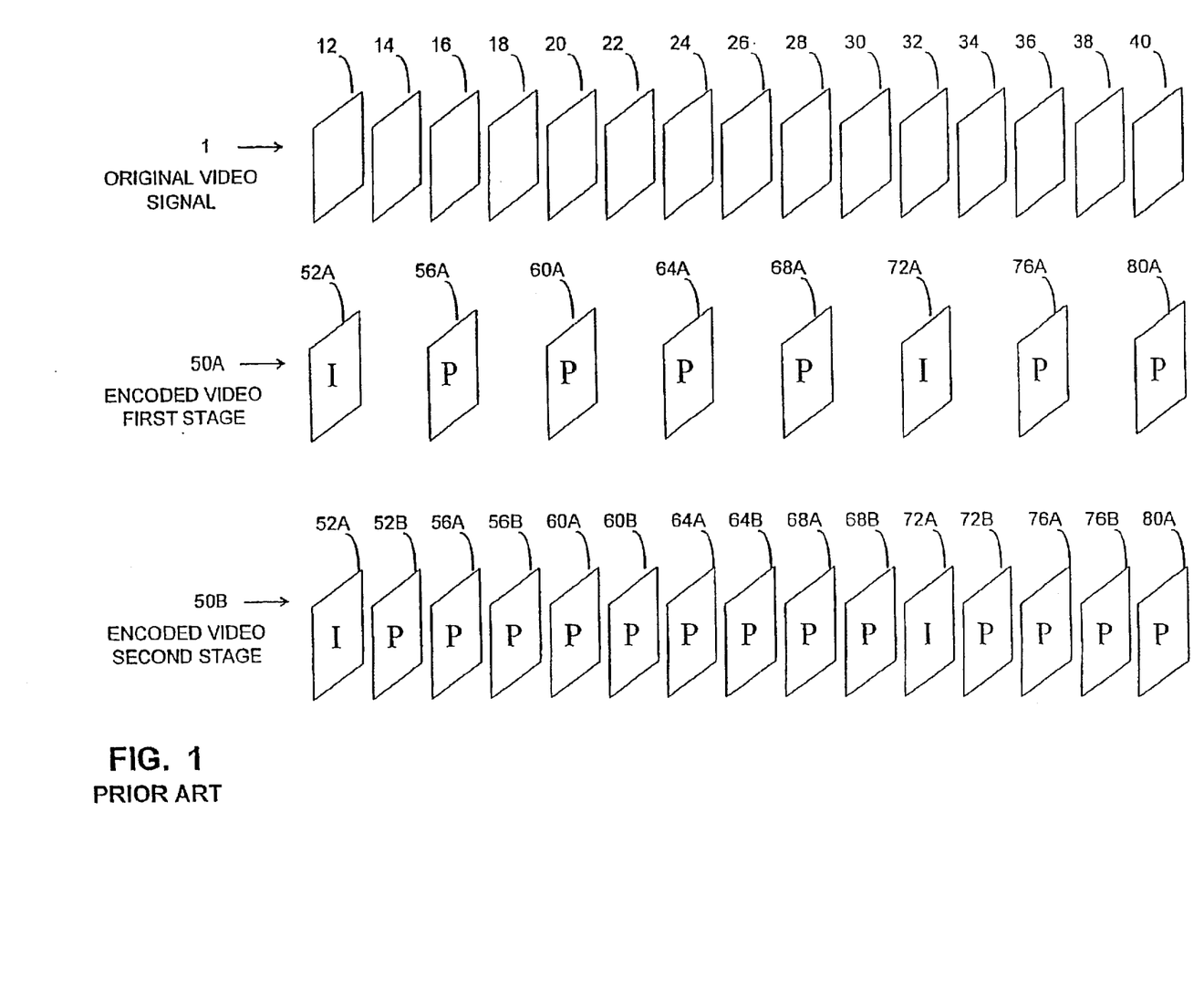
FIG. 1 is a schematic illustration of a video signal and sub-sampled compressed video, known in the art.

Reference is made to FIG. 1 which is schematic illustration of a video signal and sub-sampled compressed video, known in the art.

Video signal 1 includes fifteen original frames referenced 12, 14, 16, 18, 20, 22, 24, 26, 28, 30, 32, 34, 36, 38 and 40. Video signal 1 is provided according to the NTSC standard. The NTSC standard determines a frame rate of approximately 30 frames per second. Thus, video signal 1 represents one half of a second according to the NTSC standard.

According to the prior art, in a first stage, half (every other frame) of the original frames are digitized, compressed so as to produce a frame-set 50A. In the present example, original frames 11, 18, 22, 26, 30, 34 and 38 are not digitized.

Frame-set 50A is an MPEG partial representation of video signal 1, compressed according to a sub-sampling rate of half. Frame-set 50A includes I-frames 52A and 72A and P-frames 56A, 60A, 64A, 68A, 76A and 80A. I-frames 52A and 72A are compressed representation of original frames 12 and 32. P-frames 56A, 60A, 64A, 68A, 76A and 80A are compressed representation of original frames 16, 20, 24, 28, 36 and 40.

It will be appreciated by those skilled in the art that if frame-set 50A were provided to a standard MPEG decoder, the decoder would play it, frame by frame, at a rate of 30 frames per second. Thus, frame-set 50A, which includes 8 frames, will be played for a period of time of about one quarter of a second.

The time period spanned between original frames 12 and 40 is about half a second and so should be the time period determined by I-frame 52A and P-frame 80A. In reality, a decoder provides each frame 1/30 of a second and thus, the actual time period which elapses between the displaying of I-frame 52A and P-frame 80A is about one quarter of a second.

To overcome this problem, a second stage is performed in which a compressing controller edits the stream and adds, after each of the compressed frame, a string of bits which represents a P-frame, relating to the adjacent previous reference frame, so as to transform frame-set 50A into frame-set 50B.

Frame-set 50B includes, in addition to the frames of frame-set 50A, P-frames 52B, 56B, 60B, 64B, 68B, 72B and 76B.

Accordingly, frame-set 50B has now an identical number of frames as the original video signal 10. A decoder, decoding frame-set 50B, will present frame-set 50B in half a second, since it includes 15 frames wherein each is displayed in 1/30 of a second.

At first, the decoder decodes I-frame 52A and provide it for display. Then, the decoder decodes P-frame 52B, which is a prediction that the present frame is identical to the previous one and so, the decoder provides frame 52A for display, again. Accordingly, each of the frames originated at frame-set 50A, is provided for displayed twice, when decoding frame-set 50B.

The disadvantages of this method are as follows:

According to the MPEG standard the size of a P-frame that contains no information other than a reference to another frame, is around 100 bits of storage area which, as will be appreciated by those skilled in the art, can be accumulated into a considerable amount of storage area.

It is therefore clear that although, this prior art method stores and provides half of the visual information, it uses more than half of the storage area required to store the entire MPEG video, thus failing to decrease the bit-rate by the sub-sampling factor. Though only half of the information is present, more than half of the bandwidth is required for compression.

Furthermore the prior art method multiplies each previous adjacent reference frame. Therefore it can only use I frames and P-frames as a source, because they are the types of frames which are defined in the standard as reference frames. A B frame can not be a reference frame and as such, it can not be used as a source for multiplication. Hence, this method can not make any use of B-frames in the first stage of creating frame-set 50A. It will be appreciated that the full compressing skills of MPEG-1 are not utilized according to these methods.

Additionally, the method is not applicable to audio compression. The MPEG audio compression techniques does not allow editing as described above for video.

Moreover, the method is only applied to MPEG video compression or to other compression techniques that have syntactic elements such as P frames. Such elements are required to represent frames by specifying reference frames of which they are duplicates.

SUMMARY OF THE PRESENT INVENTION

It is an object of the present invention to provide novel system for producing low bit-rate MPEG streams using sub-sampling which overcomes the disadvantages of the prior art.

Referring to the disadvantages of the prior art:

The system decreases the bit-rate required to encode sub-sampled video streams by the sub-sampling factor.

Furthermore, the system does not preclude the encoding of B-frames during the video encoding process.

Additionally, the system is applicable to audio signals as well as video signals.

Moreover, the system is applied to any compression technique that supports time stamps to synchronize decoded audio and video.

It is another object of the present invention to provide a method for operating the system. The method includes the following steps:

Sampling the given signals, according to a predetermined or dynamic duty cycle, so as to provide a plurality of digitized samples;

Encoding the digitized samples, so as to produce encoded samples; and

Attaching a presentation time stamp to a selection of the encoded samples wherein each selected encoded sample is to be reproduced at a point in time determined by the presentation time stamp attached thereto.

The step of encoding can be performed according to MPEG compression, or any other smaller compression method.

According to one aspect of the invention, at least one of the given signals is a video signal. According to another aspect of the invention, at least one of the given signals is an audio signal.

The duty cycle is given by $$\frac{K}{N}$$

wherein N is the number of detected samples in a given cycle and K is the number of selected samples in the given cycle.

A method of the invention is also operable using encoders which receive the sample for encoding together with the presentation time stamp and so produce frames which already include presentation time stamps.

In accordance with another aspect of the invention, there is thus provided a system for providing a sub-sampled compressed signal which includes at least one sampling unit, at least one encoding unit, wherein each of the encoding units is associated and connected to a selected one of the sampling units, a controller at least one sampling unit, for sampling at least one signal, so as to provide at least one sampled stream, at least one encoding unit, wherein each of the encoding units is associated and connected to a selected one of the sampling units, a controller, a multiplexer.

The controller connected to sampling units and to the encoding units and the multiplexor is connected to the encoding units and to the controller.

Each of the encoding units encodes a sampled signal, so as to produce an encoded stream which includes a plurality of encoded frames. The controller provides a presentation time stamp to each of the encoded frames. Finally, the multiplexor multiplexes the encoded streams.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

Within a conventional MPFG encoding system, each video and audio encoder is driven by its own clock. Each encoder times the emission of access units. Access units are the encoded representations of presentation units. A presentation unit of a video signal is a video frame or field and the presentation unit of an audio signal is an audio frame. The multiplexor also contains a clock that times the emission of multiplexed bytes at the multiplex rate. This clock is called the STC (System Time Clock).

It is a basic requirement of the system that it guarantee that the decoded audio and video at the output of the MPEG decoder are synchronized with each other despite the relative independence of the timings of each respective encoder.

The MPEG Systems specifications guarantee audio/video synchronization by ensuring "end-to-end synchronization" of each elementary stream encoder-decoder pair. End-to-end synchronization means that elementary stream decoders decode and present units at the same rate as they are captured and compressed by their peer encoders. End-to-end synchronization is supported by the MPEG Systems specifications in multiplexed streams through the embedding and retrieval of the SCR (System Clock Reference—for MPEG1 System) or PCR (Program Clock Reference—for MPEG2 Program and MPEG2 Transport), PTS (Presentation Time Stamp) and DTS (Decoding Time Stamp) fields by the multiplexer and demultiplexor respectively. The SCR or PCR fields, combined with the time at which they arrive at the decoder, enable the reconstruction of the encoder STC by the demultiplexor.

A DTS field indicates the time, as measured by the STC reconstructed by the demultiplexer, at which the associated access unit should be decoded by the audio or video decoder. A PTS field indicates the time at which the associated presentation unit should be displayed.

A conventional multiplexor combines related audio and video encoded streams into one stream with timestamp information. The timestamp information enables compensation for minor shifts between each encoder clock and the clock in the decoder of that stream. This end-to-end synchronization will ensure synchronization between the decoded video and the decoded audio.

The present invention provides a novel method for compressing video and audio at very low bit-rates using sub-sampling and multiplexing in a way which is transparent to a conventional MPEG playback system. According to the present invention, the way each signal is sub-sampled may change with time and does not depend on the way the other signal is sub-sampled. Moreover, one of the signals may be sub-sampled and the other not. The method can be applied to one or more signals of audio and to one or more signals of video.

According to the invention, sub-sampling of audio refers to the omission of some of the audio samples that were sampled by the digitizer at one of the conventional sample rates. Sub sampling of video refers to the omission of video frames that were sampled at the rate determined by the broadcasting standard such as NTSC or PAL. The remaining samples are presented to the audio or video encoder for encoding.

The rate at which each encoder produces bytes will be less than it would be without sub-sampling by approximately the sub-sampling factor. For example, choosing a sub-sampling rate of half for both audio and video, during one second, both the audio and video encoders produce streams which contain approximately half the data than would have been produced had all the samples been encoded.

Normally video and audio decoders will take only half a second to playback these video and audio streams respectively. Both video and audio playback will seem to have been sped up to twice the speed. The decoded audio signal will also have a higher pitch than the encoded signal.

According to the present invention, the system clock is used to stamp the compressed audio and video streams in a way that effectively "stretches" the duration of the playback back to one second.

According to the invention this is done by setting the timestamps (PTS and DTS values) for an access unit to the values that would be associated with the same access unit had no sub-sampling been applied.

Those skilled in the art will appreciate that according to the MPEG specifications, timestamps need not be provided for every access unit. Moreover, timestamps appear in packet headers that need not be co-located with access unit headers. Decoders are expected to interpolate between timestamp values that are embedded in the stream for access units to which timestamps are not attached. The interpolation is done assuming a nominal increment between timestamps. The nominal value is derived from the sampling rate implicit in the compressed stream syntax. In doing so, decoders will not calculate the correct timestamps for access units that do not have time-stamps.

According to the invention, the multiplexor beings a new packet before every header of an access unit. The multiplexor also attaches a decoding time stamp (DTS and or PTS) for each packet. Thus, timestamps are provided for every access unit and interpolation by the decoder is never required. This special attachment of presentation time stamps to each sampled frame is a novel type of multiplexing, introduced by the present invention.

As an example, consider a video encoder that is encoding an NTSC video signal an audio encoder applying a 44.1 KHz audio sampling rate and Layer 2 compression.

Sub-sampling at a sub-sampling rate of one half would produce in one fifteenth of a second, a single video frame. This procedure has halved the bit-rate produced by each encoder. A conventional MPEG video decoder will display one frame in approximately one thirtieth of a second. This is because the video encoder, though provided with only half the frames, was instructed to encode an NTSC signal. The video stream will therefore contain an instruction to the decoder to playback the stream at 30 frames per second.

Accordingly to the present invention, the difference between PTS values is set at one fifteenth of a second rather than one thirtieth, which would be correct had the streams not been sub-sampled. An MPEG system decoder, that demultiplexes the system layer information, retrieves and applies the timestamp information. According to the timestamps, data included in one frame is to be presented for a period of one fifteenth of a second before being replaced by the following frame, therefore each frame will be displayed twice.

Using Layer 2 compression, each audio frame will contain 1,152 samples, representing approximately a fortieth of a second of playback. When sub-sampled at half the rate, the effective sampling rate is 22,050 samples per second. A conventional audio decoder would present 40,100 samples a second, as instructed by information embedded in the audio stream. This would results in playback at double the correct speed and at an incorrect pitch.

According to the invention, the difference between consecutive PTS values is set to be approximately one twentieth of a second. An audio decoder attached to a system decoder, that retrieves timestamp information will be forced to repeat each frame thus play back at an effective rate of 22,500 samples per second.

It will be noted also, that were interpolation applied by the decoder to calculate timestamps that were not embedded in the stream, the playback would not be smooth. Using the video signal in the example to illustrate, frames without timestamps would be assumed by the decoder to be displayable one thirtieth of a second after the previous frame. The duration of some frames would differ from others producing a jerky effect.

Figure 2:
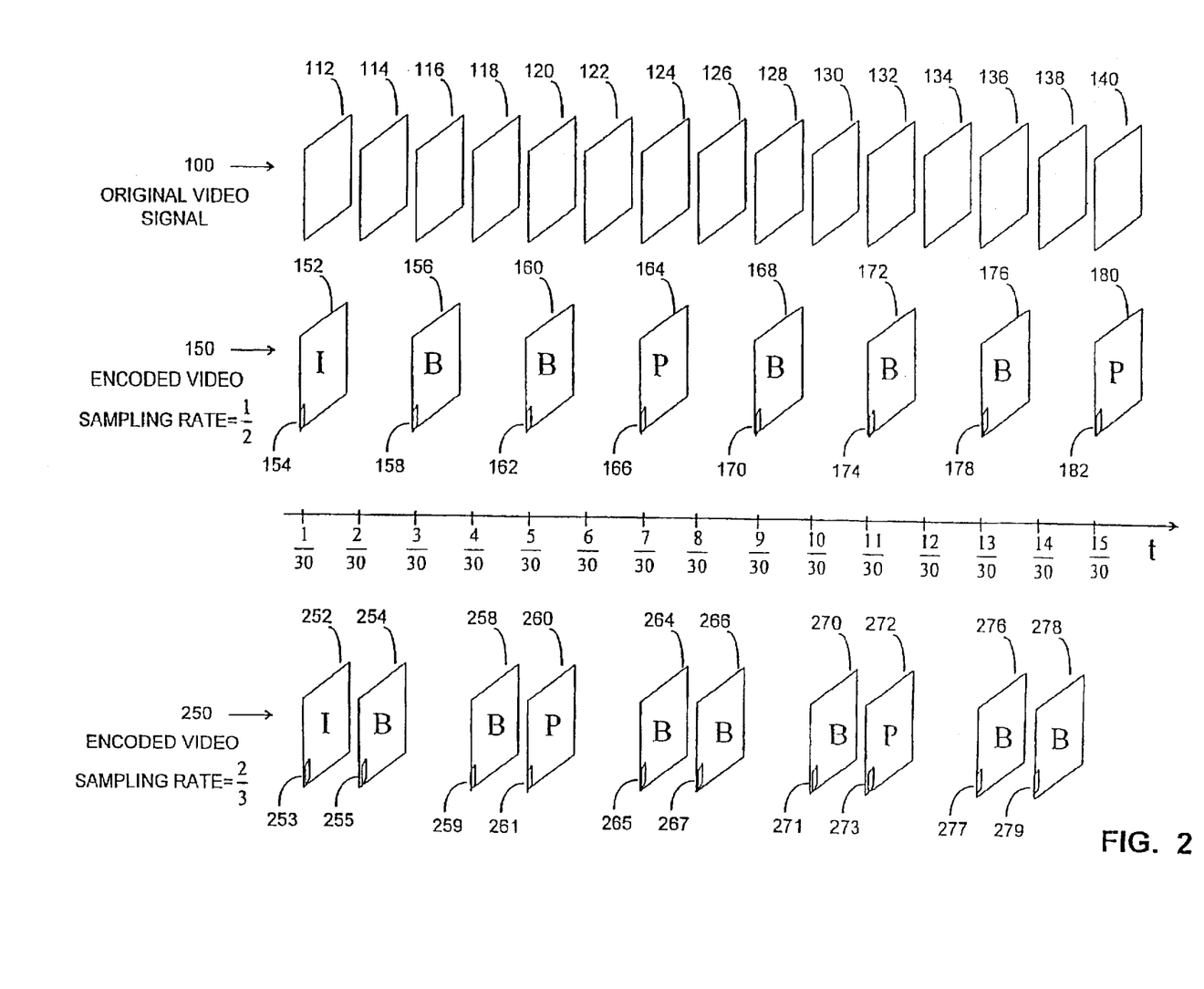
FIG. 2 is a schematic illustration of a video signal and sub-sampled compressed video frame-sets, in accordance with a preferred embodiment of the present invention.

Reference is made to FIG. 2 which is a schematic illustration of a video signal, referenced 100 and sub-sampled compressed video frame-sets 150 and 250, constructed and operative with a preferred embodiment of the present invention. Video signal 100 includes plurality of original frames 112, 114, 116, 118, 120, 122, 124, 126, 128, 130, 132, 134, 136, 138 and 140.

Frame-set 150 shows some frames compressed from frame-set 100 in the order in which they are to be presented. Frame-set 150 includes I-frame 152, P-frames 164 and 180 and B-frames 156, 160, 168, 172 and 176. I-frame 152 is a compressed representation of original frame 112. P-frame 164 is a compressed representation of the original frame 124. B-frame 156, is a compressed representation of the original frame 116.

I-frame 152 has a PTS 154 of $1/30$, B-frame 156 has a PTS 158 of $3/30$, B-frame 160 has a PTS 162 of $5/30$. The rest of frames 164, 168, 172, 176 and 180 have PTSs 166, 170, 174, 178 and 182, respectively.

A conventional MPEG decoder utilizes the PTS, so as to determine the time when the first frame in a selected packet is to be provided for display. Moreover, an MPEG decoder has to provide decoded frames to a display device, or other video equipment, according to a predetermined broadcast standard. In the present example, the broadcast standard is NTSC which requires the decoder to provide 30 frames per second. Furthermore, it will be noted, that until the presentation time of any frame has arrived, a conventional MPEG decoder will repeat the display of the most recently presented frame.

A decoder decodes the compressed frames or frame-set 150 and provides the visual representations of the corresponding original frames for display, each according to the presentation time stamp attached thereto.

Accordingly, at time point $1/30$, after decoding I-frame 152, the decoder will provide a visual representation of original frame 112, for display. At time point $3/30$, after decoding B-frame 156, the decoder will provide a visual representation of original frame 116. Frame-set 150 does not include a compressed frame to which a time stamp of $2/30$ is attached. Thus, at time point $2/30$, the time for the presentation of the next frame has not arrived. Accordingly, at that point in time, the decoder will provide the visual representation of original frame 112 for display.

According to the invention, any type of frame, an I-frame, a P-frame and a B-frame, can be used, providing higher compression levels, using less storage area and requiring lower bit rates. Furthermore, the present invention does not require artificial multiplication of frames to indicate that the decoder should reproduce an already decoder frame. Thus, it will be appreciated by those skilled in the art, that the present invention requires less storage area, for compressing a given video signal, than prior art methods.

It will be noted that the present invention can be implemented at various sub-sampling ratos. For example, the rate can be a rational number denoted by $$\frac{K}{N}$$

wherein N is the number of detected samples in a given cycle and K is the number of selected sample in said given cycle.

Frame-set 250 is an MPEG frame-set which is compressed according to the invention, at a sub-sampling rate of $2/3$. For example, I-frame 252, B-frame 254, B-frame 258, P-frame 260 and B-frame 264, are each provided in a separate packet including time stamps 253 ($1/30$), 255 ($2/30$), 259 ($4/30$), 261 ($5/30$) and 265 ($7/30$), respectively.

In this case, the decoder will decode I-frame 252 and provide a visual representation at original frame 112 to a display at time point $1/30$. It will decode B-frame 254 and provide a visual representation of original frame 144 to a display at time point $2/30$ and since it has no new frame for presenting at until B-frame 258, which is due at time point $4/30$, it will provide a visual representation of original frame 114 to a display at time point $3/30$.

Figure 5:
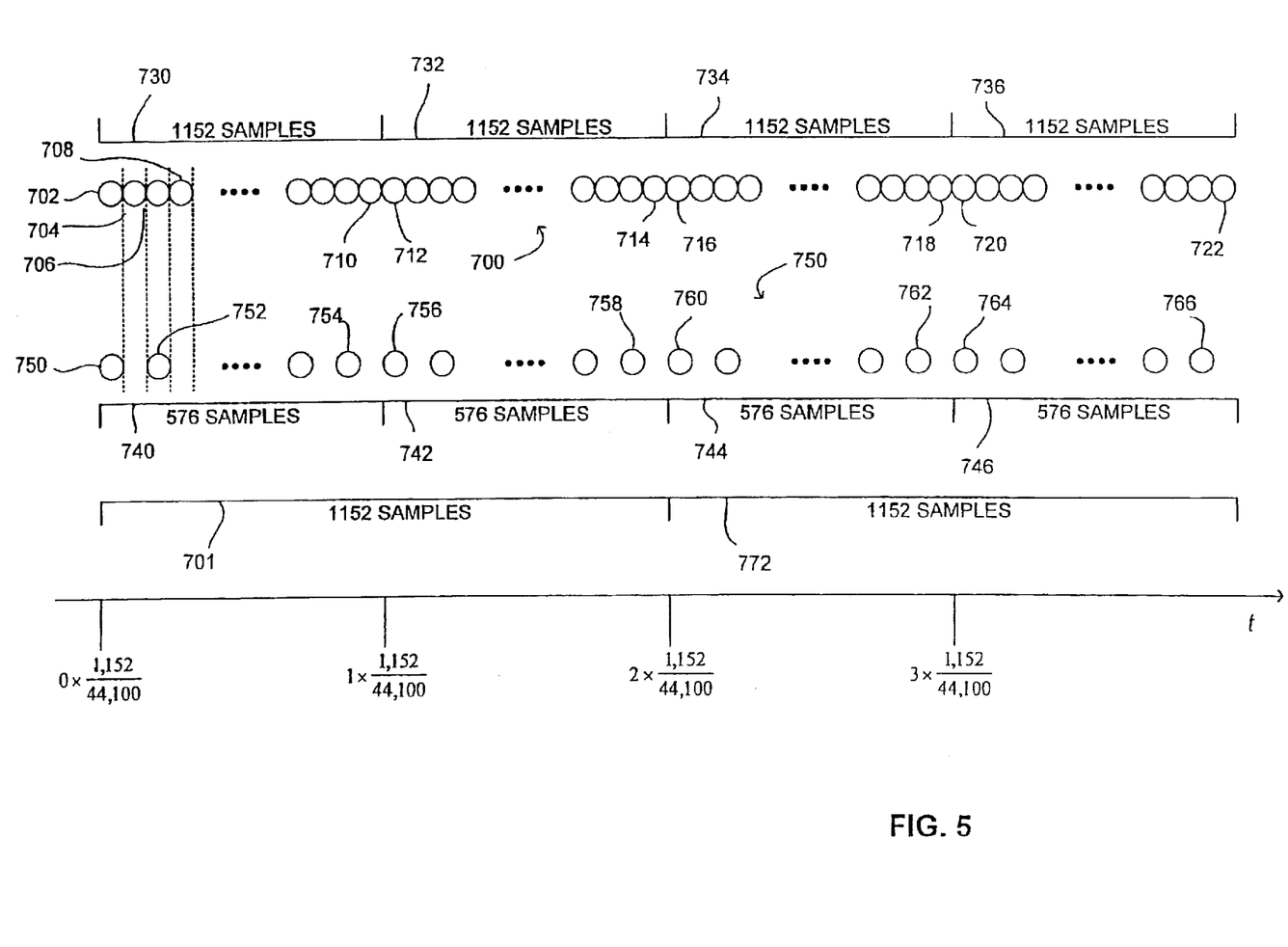
FIG. 5 is a schematic illustration of a sampled audio signal and a corresponding sub-sampled audio signal, in accordance with a preferred embodiment of the present invention.

Reference is now made to FIG. 5, which is a schematic illustration of a sampled audio signal, generally referenced 700 and a corresponding sub-sampled audio signal, generally referenced 750. In accordance with a preferred embodiment of the present invention.

Sampled audio signal 700 includes a plurality of samples 702, 704, 706, 708, 710, 712, 714, 716, 718, 720 and 722. Sample audio signal 700 is divided into a plurality of frames 730, 732, 734 and 736. Each including one thousand, one hundred and fifty two (1,152) samples. Audio frame 730 includes this number of samples wherein the first one is audio sample 702 and the last one in the frame, is audio sample 710.

Audio frame 732 also includes 1,152 samples beginning with audio sample 712 and ending with audio sample 714. Similarly, audio frame 731 includes 1,152 samples beginning with audio sample 710 and ending in audio sample 718. Finally, audio frame 736 also includes 1,152 samples beginning with audio sample 720 and ending in audio sample 722.

Sub-sampled audio signal 750 includes a plurality of sub-sampled frames 740, 742, 744, and 746. Each of the sub-sampled frames includes a plurality of audio samples. Sub-sampled frame 740 includes five hundred and seventy six (576) samples, the first being audio sample 750 and the last being sample 754. Audio sub-sampled frame 742 also includes 576 audio samples, wherein the first one is audio sample 756 and the last one is audio sample 758.

Audio sub-sampled frame 744 also includes 576 samples. The first one being audio sample 760 and the last being audio sample 762. Audio sub-sampled frame 746 also includes 576 samples. The first one being audio sample 764 and the last being audio sample 766.

Sub-sampled audio signal 750 can be produced directly from the audio signal which was used to produced sample audio signal 700. In the present example sub-sampled audio signal 750 is produced from sampled audio signal 700, by selecting every other audio sample. Accordingly audio sample 750 is identical to audio sample 702 and audio sample 752 is identical to audio sample 706. Audio sample 708 and 704 which are present in audio signal 700, are not included in the sub-sampled audio signal 750.

Accordingly, the number of audio samples in a sub-sampled audio frame such as sub-sampled frame 740, is half the number of audio samples in a conventional audio frame such as frames 730. Respectively, the sub-sampling ratio is 2:1.

Sub-sampled frames 740 and 742 are combined so as to produce a frame 770, including 1,152 samples. Accordingly sub-sampled frames 744 and 746 are combined so as to produce a frame 772, including 1,152 samples.

While the sampled audio stream 700 includes four frames of 1,152 samples each, of the sub-sampled audio stream 750 includes two frames of 1,152 samples each. Hence, sub-sampled audio stream 750 requires close to half the storage area required for stream 700.

According to the present example a second of sampled audio stream such as sampled audio stream 700 includes 44,100 samples, accordingly audio frames 730, 732, 734 and 736 include time stamps of $$0 \times \frac{152}{44,100}, 1 \times \frac{152}{44,100}, 2 \times \frac{152}{44,100}, \text{ and } 3 \times \frac{152}{44,100}.$$

respectively. These times samples indicate the point in time for starting to play a given frame. It will be noted that the time stamp of the preceding proceeding frame together with a time stamp of a current frame, determine the length of the time period in which an audio frame is to be played.

According to the present invention, audio frame 770 and 772 including time stamps of $$0 \times \frac{152}{44,100} \text{ and } 2 \times \frac{1,152}{44,100},$$

respectively. Thus, these time stamps determine that the audio frame 770 is to be played from the first time stamp up until the second time stamp thereby "stretching" 1,152 samples over a time period of $$2 \times \frac{1,152}{44,100}$$

of a second, as opposed to the play back manner of audio frame 730, playing 1,152 samples over a time period of $$1 \times \frac{152}{44,100}$$

of a second.

An MPEG decoder is required to adjust it's clock according to the schedule determined by the time stamp. Having done so, the pitch of the decoded output will be correct. It will be noted that any sub-sampling ratio is applicable for the present invention.

Figure 3:
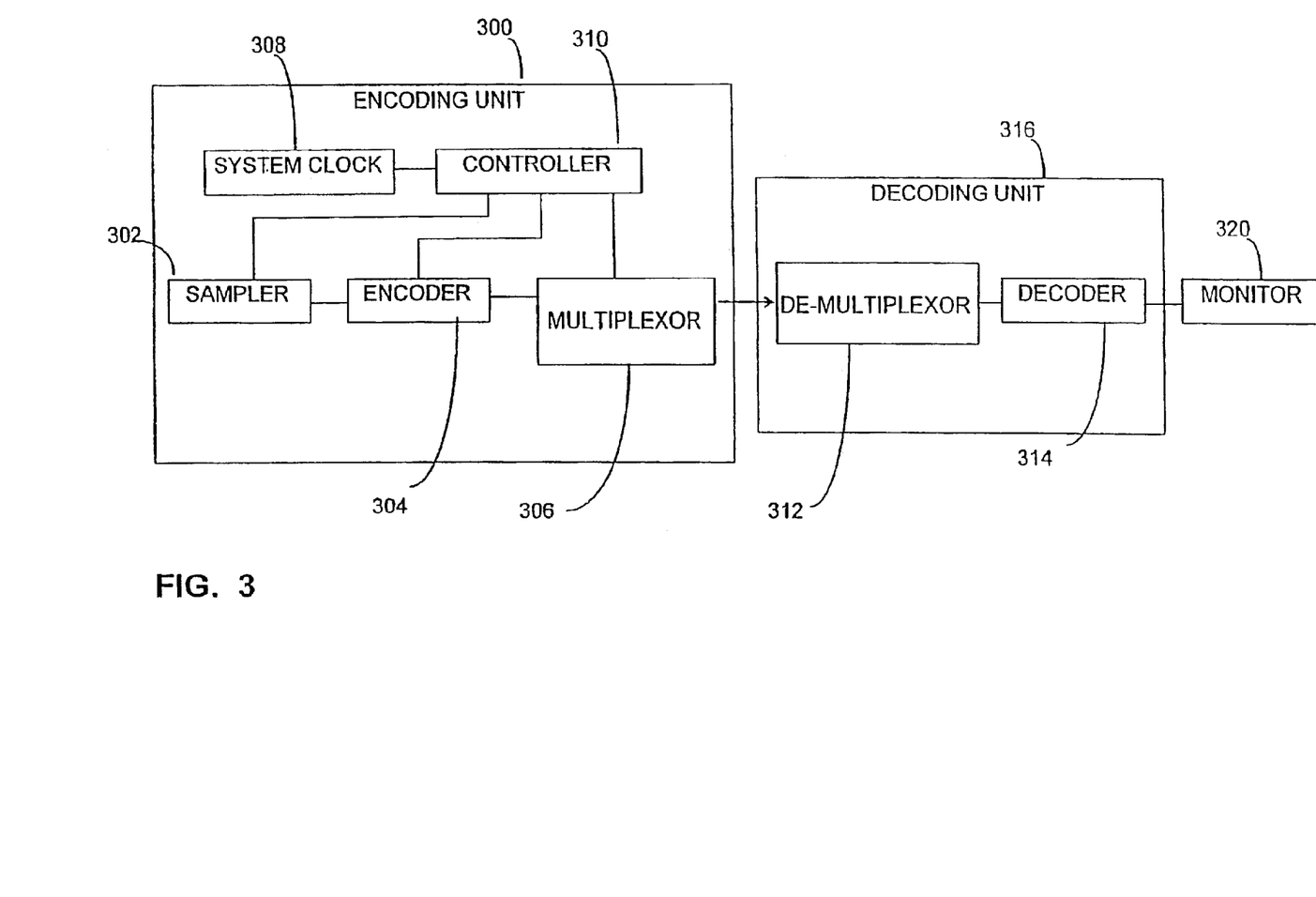
FIG. 3 is a schematic illustration of a system, for sub-sampling and compressing a video signal, constructed and operative in accordance with a further embodiment of the present invention.
Figure 4:
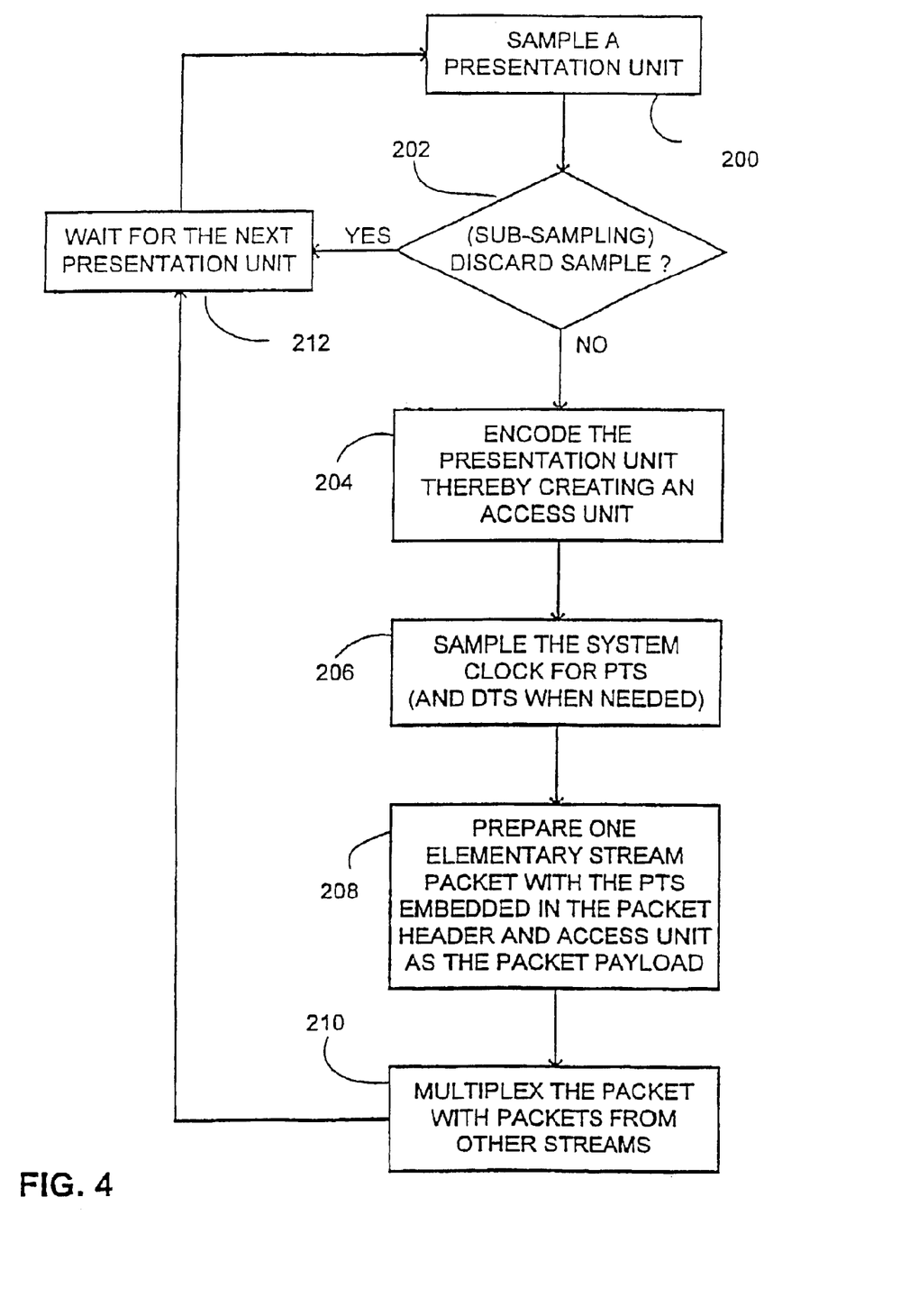
FIG. 4 is a schematic illustration of a method for sub-sampling and compressing a video signal, operative according to another embodiment of the present invention.

Reference is made to FIGS. 3 and 4. FIG. 3 is a schematic illustration of a system, generally referenced 300, for sub-sampling and compressing a video signal, constructed and operative in accordance with a further embodiment of the present invention. FIG. 4 is a schematic illustration of a method for sub sampling and compressing a video signal, operative according to another embodiment of the present invention.

System 300 is an encoding unit which includes a sampler 302, an encoder 304, connected to the sampler 302, a multiplexer 306, connected to the encoder 304, a system clock 308 and a controller 310, connected to encoder 304, system clock 308, sampler 302 and multiplexer 306.

FIG. 3 also illustrates monitor 320 and a decoding unit 316 which includes a de-multiplexed 312, a decoder 314 connected to de-multiplexor 312.

The sampler 302, the encoder 304 and the decoder 314, can operate on audio only, video only or any number of signals of audio and video.

The sampler 302 samples on incoming signal, according to a predetermined sampling rate. The sampler 302 provides the samples produced thereby, to the encoder for encoding according to a conventional MPEG into an encoded stream, the multiplexor 306 arranges the encoded frames in packets. The controller 310, time by the system clock 308, monitors the transformation of signal into samples into an encoded stream and into packets. The controller provides time stamps to the multiplexor which in turn, attaches them to selected ones of the multiplexor packets.

The encoding unit 300 provides the MPEG packets to the decoding unit for reproducing. The de-multiplexor 312 unpacks the packets so as to retrieve the time stamps and provides the MPEG encoded stream to the decoder 314. The decoder 314 decodes the MPEG stream into a signal to be played and provides it, according to the time stamps to the monitor 320, which in turn, plays them as sound, video or both.

Reference is now made also to FIG. 4. The method as illustrated in FIG. 4 can be utilized for operating system 300. FIG. 4 illustrates the method applied to each elementary stream in the system, which can be either an audio elementary stream or a video elementary stream.

In step 200, the system samples an original presentation unit, of an elementary stream. For audio signals the presentation unit is a set of samples combined for compression in an audio frame. When Layer-2 audio is being compressed each presentation unit has 1,152 samples. For video signals the presentation unit is a video frame.

Sub-sampling is also performed according to a predetermined sub-sampling rate (step 202). When a sample is discarded, then, the system proceeds to step 212. Otherwise, the system proceeds to step 204.

Then, the system encodes the presentation unit (step 204) and samples the system clock, thereby producing a presentation time stamp and a Decoding. Time Stamp, when required (step 206). It will be noted that in the MPEG standard, the encoded presentation unit is called an access unit.

The presentation time stamp is the time according to the system clock, at which the decoded streams encoded in step 204, are to be played.

The same system clock is used in step 204 for all elementary streams in the system. The system clock may be external to the system, may be generated by an internal unit which is not locked to any elementary stream clock, or it may be derived from a selected elementary stream clock.

In step 208, the system packs the access units into packets. Each access unit may be divided into a number of packets.

In step 210, the system 300 inserts the presentation time stamp in the header of the first packet of the access unit and proceeds to step 212, thereby waiting for the next presentation unit.

Figure 6:
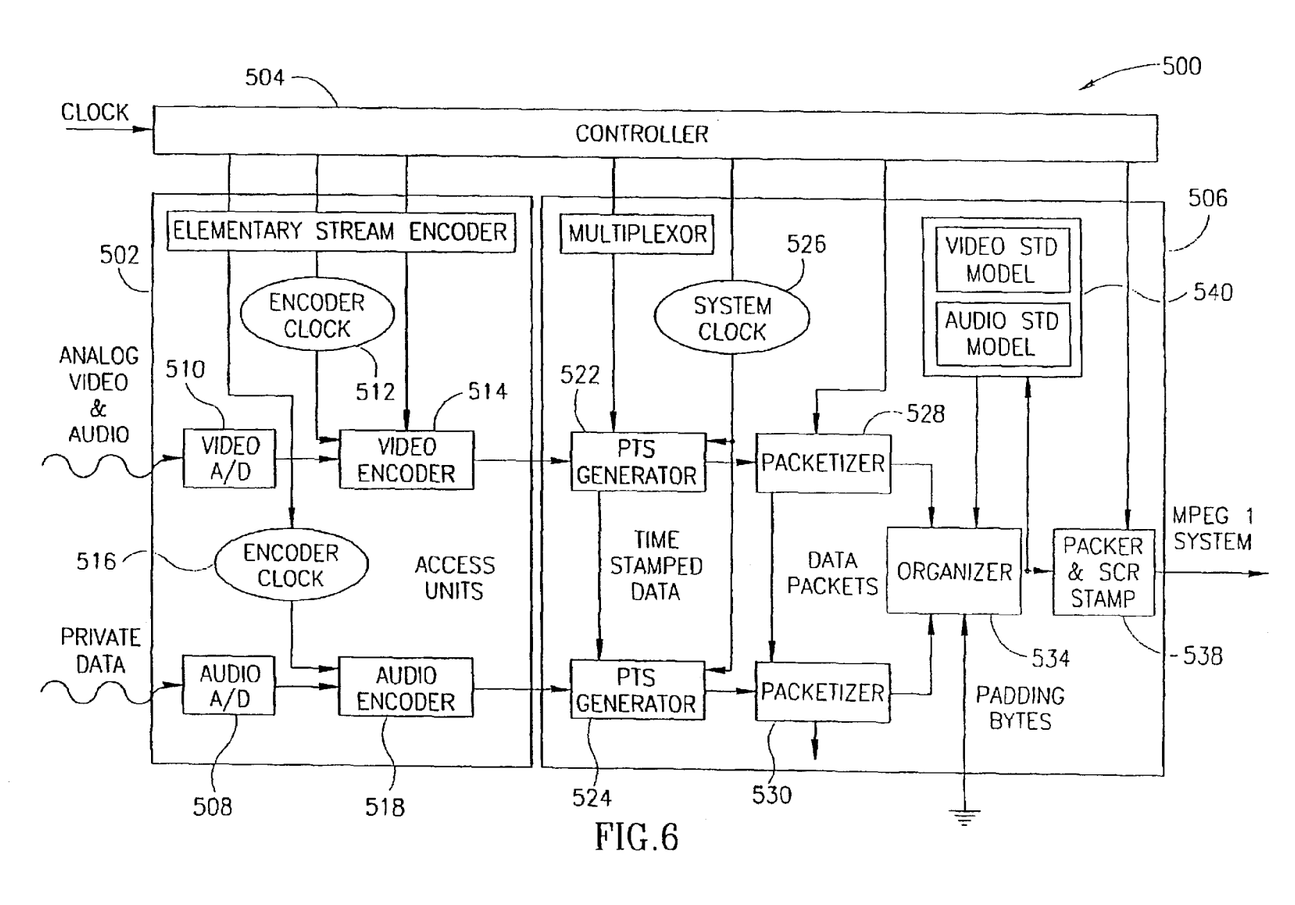
FIG. 6 is a schematic illustration of an encoding system, constructed and operative according to yet another preferred embodiment of the present invention.
Figure 7:
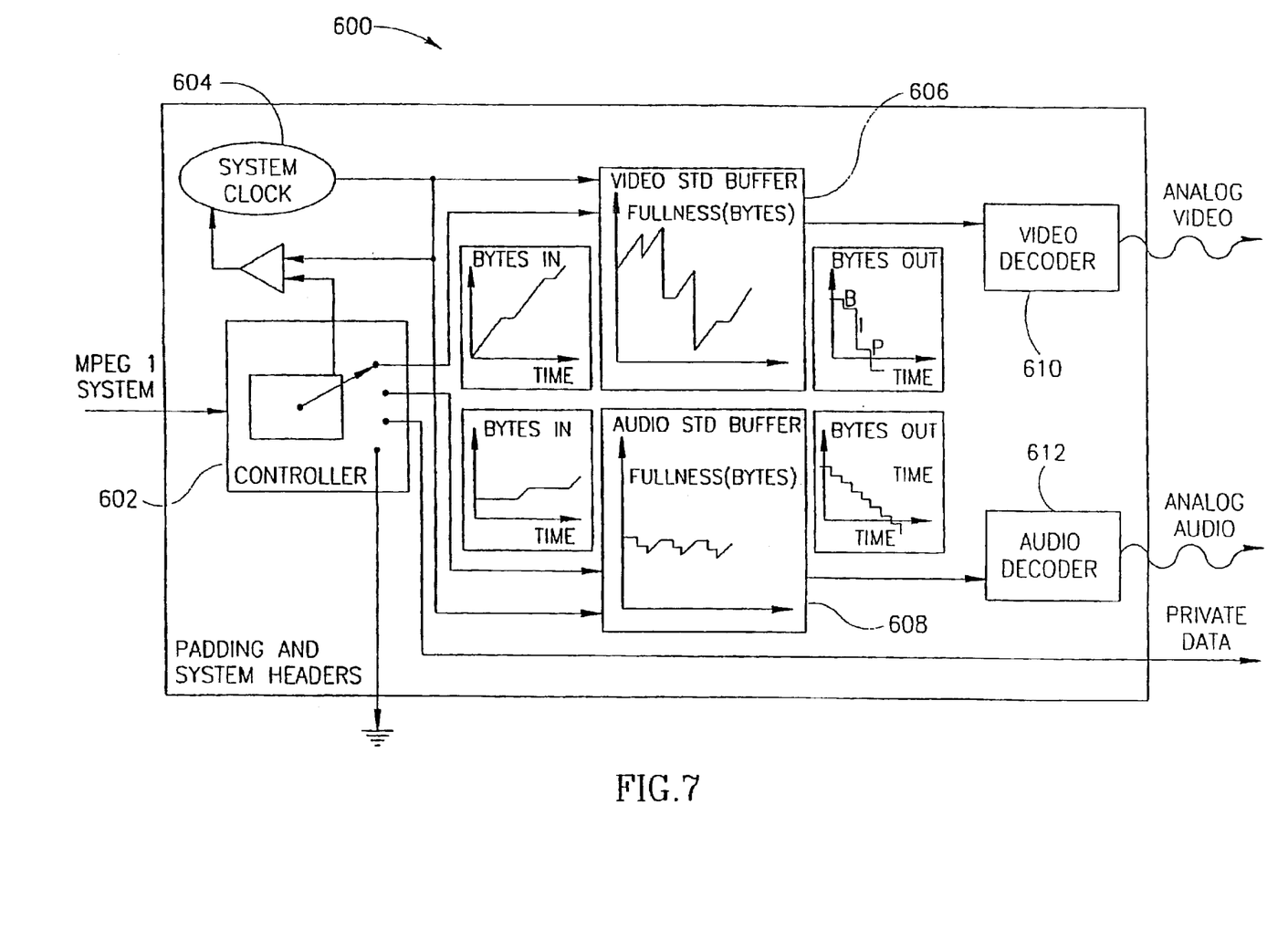
FIG. 7 is a schematic illustration of a decoding system, constructed and operative according to yet a further preferred embodiment of the present invention.

Reference is now made to FIGS. 6 and 7. FIG. 6 is a schematic illustration of an encoding system, generally referenced 500, constructed and operative according to yet another preferred embodiment of the present invention. FIG. 7 is a schematic illustration of a decoding system, generally referenced 600, constructed and operative according to yet a further preferred embodiment of the present invention.

System 500 includes an elementary stream encoder 502, a multiplexor 506 and a controller 504.

The elementary stream encoder 502 includes a video analog-to-digital (A/D) conversion unit 510, an audio A/D conversion unit 508, a video encoder clock 512, an audio encoder clock 516, a video encoder 514 and an audio encoder 518.

The video encoder 514 is connected to the video A/D 510, the video encoder clock 512. The video A/D 510 samples a video signal, digitizes it and provides it to the video encoder 514 which is timed by the video encoding clock 512.

The audio encoder 518 is further connected to the audio A/D 508, the audio encoder clock 516. The audio A/D 508 samples an audio signal, digitizes it and provides it to the audio encoder 518 which is timed by the audio encoding clock 516.

The multiplexor 506 includes a video presentation time stamp generator 522, an audio presentation time stamp generator 524, a system clock 526, three packetizers 528 and 530, an organizer 534, an STD unit 540 and a packet and SCR stamp unit 538.

The video encoder 514 provides an encoded stream to the PTS generator 522. The controller 504 commands the PTS generator 522 to generate a presentation time stamp according to system clock 526 and provides the encoded data and the PTS the packetizer 528. The controller 504 commands the packetizer 528 to produce a packet from the encoded data and the PTS, so as to produce a video packet. Then the packetizer 528 provides the video packet to the organizer 534.

The audio encoder 518 provides an encoded stream to the PTS generator 524. The controller 504 commands the PTS generated 524 to generate a presentation time stamp according to system clock 526 and provides the encoded data and the PTS to packetizer 530. The controller 504 commands the packetizer 530 to produce a packet from the encoded data and the PTS, so as to produce an audio packet. Then the packetizer 530 provides the audio packet to the organizer 534.

The organizer 534 determines the order of the video packets and of the audio packets according to rules set forth by the STD unit 540, which prevent buffer overflow and underflow. Then, the organizer 534 provides the packets to unit 538. It will be noted that the organizer may also add padding bytes to the packets, as a routine MPEG procedure.

Unit 538 packs the packets in packs, and attaches a system clock reference (SCR or PCR) stamp to the header of the pack. Then, the stream of packs is provided to a storage unit, a broadcast unit, an MPEG decoder and the like.

Decoding system 600 includes a controller 602, a system clock 604, a video STD buffer 606, an audio STD buffer 608, a video decoder 610 and an audio decoder 612.

The controller 602 is connected to the system clock 604, video STD buffer 606 and audio STD buffer 606. The a video STD buffer 606, is further connected to the video decoder 610. The audio STD buffer 608 is further connected to the audio decoder 612.

The controller 602 receives the MPEG packs from system 500, separates it into packets, classifies them and provides them accordingly. The controller 602 provides video packets to the video STD buffer 606, audio packets to the audio STD buffer 608 and "drains" padding bytes and system headers. Furthermore, the controller extracts the SCR or PCR stamp and provides it to the system clock 604, which is timed accordingly.

The system clock 604 times the STD buffers 606 and 608. The video buffers 606 provides, from the received packets, compressed video frames to the video decoder 610. The video decoder decodes the compressed video frames and produces video signal according to the presentation time stamps attached thereto.

The audio buffer 608 provides, from the received packets, compressed audio frames to the audio decoder 612. The audio decoder decodes the compressed audio frames and produces an audio signal according to the presentation time stamps attached thereto.

It will be noted that the present systems 500 and 600 provide MPEG encoding and decoding of sub-sampled audio and video signals, wherein the reduction in required storage area is approximately linearly proportional to the sub-sampling factor.

It will be appreciated by persons skilled in the art that the present invention is not limited to what has been particularly shown and described hereinabove. Rather the scope of the present invention is defined only by the claims which follow.

What is claimed is:

1. A system for encoding at least one given signal, the system comprising:

at least one sampling unit, for sampling at least one given signal, so as to provide at least one sampled signal, said at least one given signal being time dependent;

at least one sub-sampling unit for sub-sampling said at least one sampled signal prior to encoding;

at least one encoding unit, wherein each of said at least one encoding unit is associated and connected to a selected one of said at least one sub-sampling unit, for encoding said at least one sub-sampled signal, so as to produce at least one encoded stream, said encoded stream including a plurality of encoded frames;

a controlled connected to said at least one sub-sampling unit and said at least one encoding unit; and a multiplexing connected to said at least one encoding unit and to said controller, for multiplexing said at least one encoded stream, wherein said controller provides a time stamp to each encoded frame of said at least one encoded stream.

2. A method of encoding a signal at a sampling rate not provided for by a coding standard appropriate for the signal, said method comprising:

receiving an original signal sampled at an original sampling rate;

sub-sampling the original sampled signal to obtain a sub-sampled signal having a sampling rate not provided for by said coded standard;

encoded the sub-sampled signal using an appropriate coding standard to obtain a plurality of encoded frames; and attaching at least one timestamp to each encoded frame, wherein the timestamp attached to an encoded frame is the timestamp that would be attached to the encoded frame if no sub-sampling is performed.

3. A method according to claim 2 wherein the said original signal is a video signal.

4. A method according to claim 2 wherein the said original signal is a audio signal.

5. A method according to claim 2 wherein said coding standard is MPEG compression.

6. A method according to claim 2 wherein said sub-sampling is performed using a duty cycle given by K/N, wherein N is the number of frames in the original signal in a cycle and K is the number of selected frames in said given cycle.

7. A method according to claim 6 wherein said duty cycle is predetermined.

8. A method according to claim 6 wherein said duty cycle is dynamic.

9. A method according to claim 2 wherein attaching at least one timestamp to each encoded frame comprises including no more than one encoded frame in a packet and including a timestamp corresponding to said no more than one encoded frame in a header of said packet.

10. A method according to claim 2 comprising transmitting the plurality of encoded frames.

11. A system according to claim 1 wherein said at least one sub-sampling unit is configured to sub-sample said at least one sampled signal using a duty cycle given by K/N, wherein N is the number of frames in the original signal in a cycle and K is the number of selected frame in said given cycle.

12. A system according to claim 1, wherein said duty cycle is predetermined.

13. A system according to claim 1, wherein said duty cycle is dynamic.

14. A system according to claim 1, wherein said multiplexor is MPEG-compliant and wherein said multiplexer is adapted to include no more than one encoded frame in a packet and wherein said multiplexor is adapted to attach said timestamp in a header of said packet.

* * * * *